No. 657,935. Patented Sept. 18, 1900.
C. IMBODEN.
MACHINE FOR FILLING TUBULAR CASINGS.
(Application filed Oct. 28, 1899.)
(No Model.) 2 Sheets—Sheet 1.
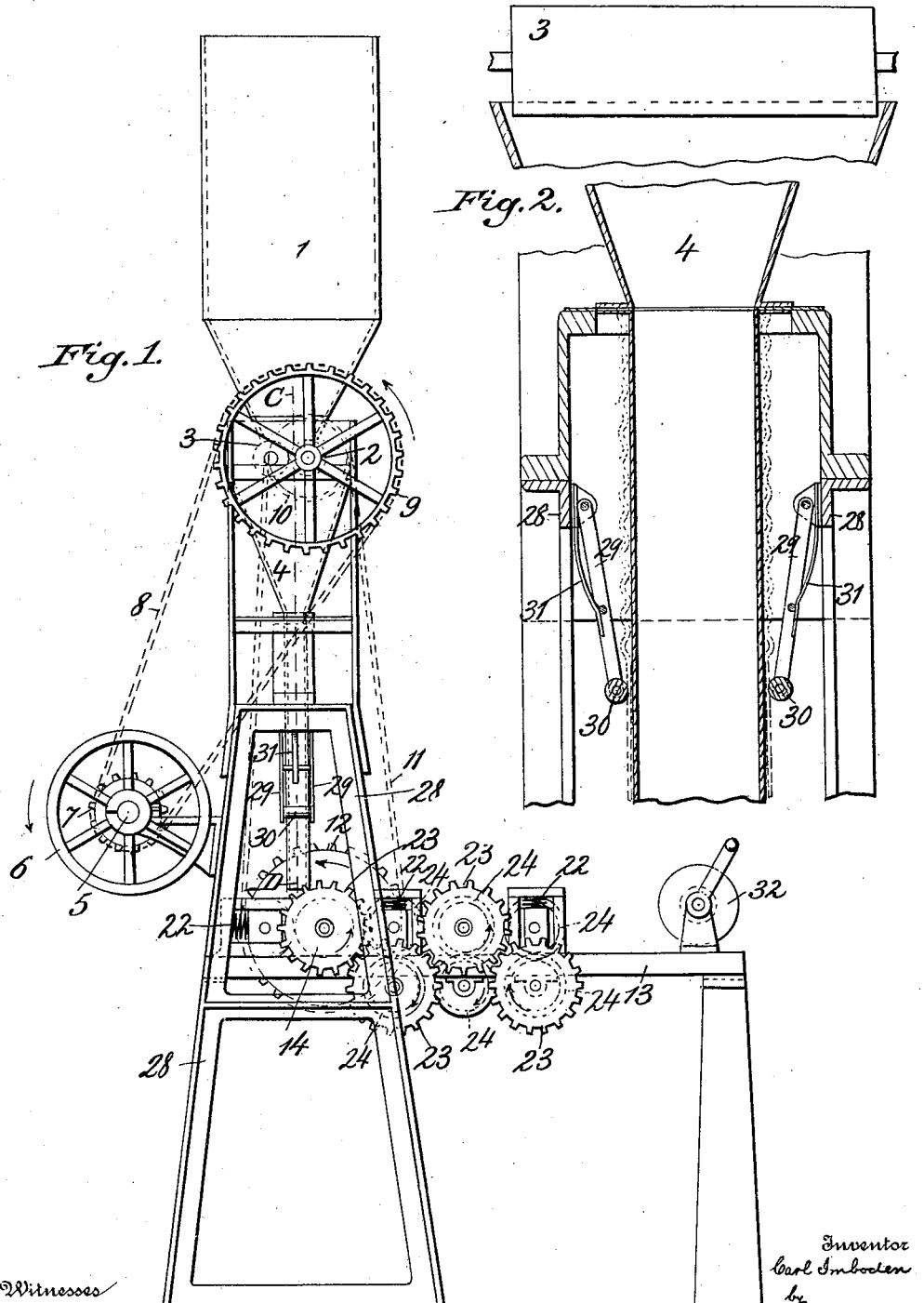
Witnesses
H. H. Schott
N. Mitchell
Inventor
Carl Imboden
by Max Georgii
his Attorney No. 657,935. Patented Sept. 18, 1900.
C. IMBODEN.
MACHINE FOR FILLING TUBULAR CASINGS.
(Application filed Oct. 28, 1899.)
(No Model.) 2 Sheets—Sheet 2.
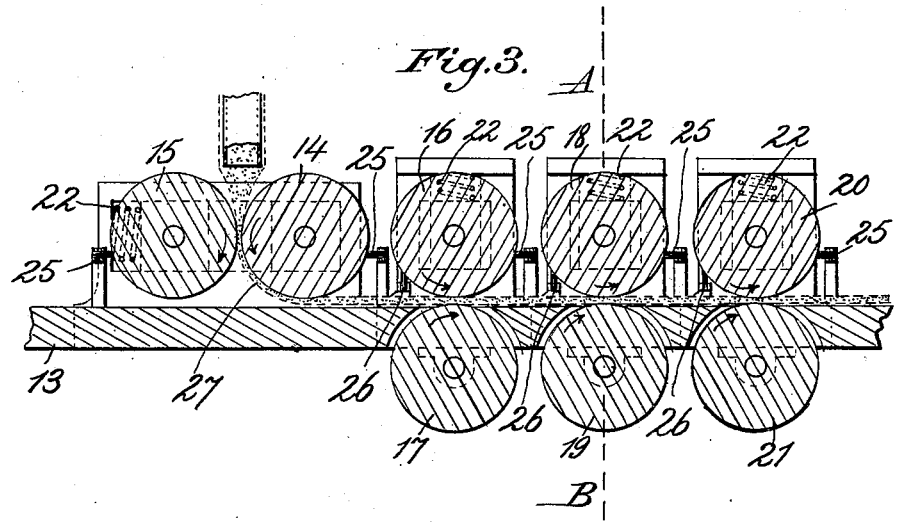
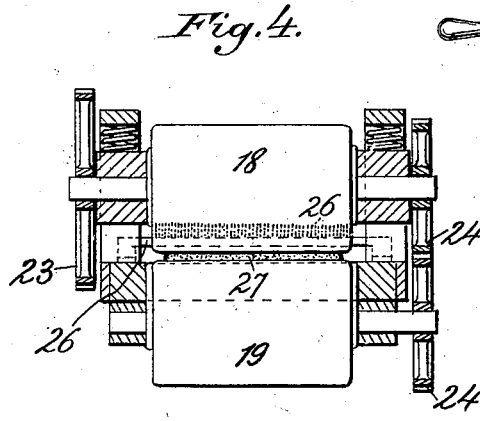
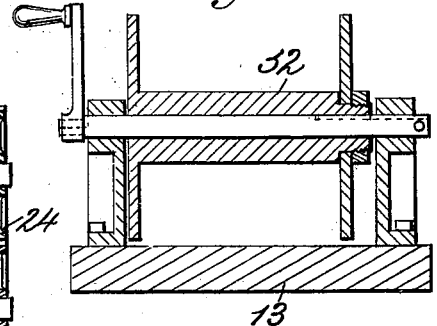
Witnesses
F. H. Schott
N. Mitchell
Inventor
Carl Imboden
by Max Georgii
his Attorney
THE NORRIS PETERS CO., PHOTO-LITHO., WASHINGTON, D. C.

United States Patent Office.

CARL IMBODEN, OF MURGENTHAL, SWITZERLAND.

MACHINE FOR FILLING TUBULAR CASINGS.

SPECIFICATION forming part of Letters Patent No. 657,935, dated September 18, 1900.

Application filed October 28, 1899. Serial No. 735,114. (No model.)

*To all whom it may concern:*

Be it known that I, CARL IMBODEN, a citizen of the Republic of Switzerland, residing at Murgenthal, Switzerland, have invented certain new and useful Improvements in Machines for Filling Tubular Casings, (patent applied for in Switzerland March 30, 1899, and in Germany March 30, 1899;) and I do hereby declare the following to be a full, clear, and exact description of the invention, such as will enable others skilled in the art to which it appertains to make and use the same.

My invention relates to a machine for filling tubular casings or the like with powdered or pulverized material, and particularly to a machine for making plaster or gypsum bandages.

The object of my invention is to provide a machine by means of which a plaster or gypsum bandage may be rapidly and cheaply produced, the bandage consisting of a tubular casing formed of a fabric having meshes, said casing being filled with pulverized gypsum, which is compressed within said casing into a cohesive strata of uniform breadth and thickness, and which will also enter and fill solidly the meshes of said casing.

A machine embodying my invention comprises means for holding a tubular casing, means for sifting gypsum powder or the like therein, means for compressing the powder in the casing and into the meshes of the tubular casing, and, if desirable, mechanism for winding up the bandage as it is made.

My invention consists, further, in the details of construction and combination of parts, which will first be described in connection with the accompanying drawings and then particularly pointed out in the claims.

In the drawings, Figure 1 is a side elevation of a machine embodying my invention. Fig. 2 is a vertical section on the line C D of Fig. 1. Fig. 3 is a longitudinal section through the rollers and table of the machine. Fig. 4 is a section on the line A B of Fig. 3. Fig. 5 shows the winding mechanism in section.

Referring to the drawings, it will be seen that at the lower mouth of the gypsum-receptacle 1 are the rollers 2 3, so arranged revolubly closely beneath each other that the gypsum powder only by the turning of these rollers 2 3 in the direction of the arrow can fall in the form of a thin strata lengthwise of the contact line of both rollers into the hopper 4. The latter ends in a pipe or filling horn of flat cross-section, over which the tricot casing is drawn.

Upon the one end of the driving-axis 5 of the machine are keyed the driving-pulley 6 and the chain-wheel 7, from which latter the chain-wheel 9, located on the other end of the axis of the roller 3, is driven by means of a transmission-chain 8. The roller 3 is taken along by friction from the roller 2. Upon the one end of the axis of the latter roller is located the chain-wheel 10, which by means of the chain 11 and the chain-wheel 12 sets in rotation the roller 14, mounted in the roller-table 15. The opposite roller 15 is driven by friction from the roller 14. In the roller-table 13 are mounted, furthermore, the three pairs of rollers 16 17 18 19 20 21. The journals of the rollers 15 16 18 20 are movably arranged and stand under the pressure of springs 22, which press these rollers against the opposite rollers arranged in immovable journals. Upon the one end of the axis of the rollers 14 17 19 21 are located gear-wheels 23, engaging each other and having an equal number of teeth, while upon the other ends of the axes of the rollers 16 to 21, inclusive, are fixed the gear-wheels 24 in such a manner that from the roller 14 are driven the rollers 17, 18, and 21, and from each of the latter the rollers 16, 19, and 20, respectively, with equal speed, whereby both rollers of each pair turn in opposite directions. Upon the roller-table 13 are placed crosswise the brushes 25 26, which brushes remove the gypsum adhering to the circumference of the rollers 14 15 16 18 20 and strew it upon the roller-table, or rather upon the gypsum-bandage 27, traveling over the table. Upon the lateral standards 28 are pivotally hung the arms 29, in whose lower ends are journaled rollers 30, which are pressed against the small sides of the filling-tube by springs 31.

The operation of the machine is as follows: After the gypsum-receptacle has been filled with gypsum powder a tricot or stockinet tubular casing is drawn over the filling-tube of the hopper 4, whose length is advantageously made many times the desired length of the gypsum-bandage which is to be produced. The free end of the tubular casing is fed between the rollers 14 15 and from them between the roller 14 and the table 13, the rollers 30 serving to prevent the tube from accidentally slipping off the filling tube or nozzle. The machine is now set in motion, and in consequence of the turning of the rollers 2 3 the gypsum powder falls into the tubular casing, while the latter is fed by the rollers 14 15 16 17 18 19 20 21 against the winding-up roller 32. In passing along between these rollers the gypsum powder filled into the tubular casing is pressed to a cohesive stratum of uniform thickness and breadth and at the same time is forced outward into the meshes of the casing. A small quantity of the gypsum powder presses outward through the meshes and remains sticking on the peripheries of the rollers. This, however, will be stripped off by the brushes 25 26 and falls upon the outer surface of the succeeding part of the gypsum-bandage, so that it is again pressed into the meshes of the tubular casing from the outside inward, and finally remains adhering in the meshes.

The winding-up roller 32 can be operated by hand. By the application of a so-called "regulator," such as is used for the winding-up roller of a loom, this operation of winding up can be done automatically from the machine-axis in such a manner that the winding speed of the roller 32 decreases with the increase in diameter of the wound-up bandage. The machine may also be provided with an automatic stop-motion device, which throws the machine out of operation at each time when a certain predetermined length of tubular casing has been filled, rolled, and wound up, whereupon the bandage upon the roller may be cut from the remainder and stripped off said roller. For the latter purpose one flange, at least, of said winding-up roller may be made removable.

Having thus fully described my invention, what I claim as new, and desire to secure by Letters Patent, is—

1. In a machine of the class described, the combination with means for filling the tubular casing, of rollers disposed in pairs for compressing said filled tubular casing, said rollers having their axes all arranged in parallelism.

2. In a machine of the class described, the combination, of means for filling the tubular casing, a pair of contacting rollers located below said filling means and adapted to compress the filled casing, and other pairs of contacting rollers arranged with their axes in a common plane and parallel with each other.

3. In a machine of the class described, the combination of means for filling the tubular casing, a pair of contacting rollers located below said filling means and adapted to compress the filled casing, and other pairs of contacting rollers arranged with their lines of contact in a plane tangent to the lower surface of the said pair of rollers.

4. In a machine of the class described, the combination with a receptacle having a filling-tube arranged to receive the tubular casing to be filled, of a pair of contacting rollers located below said filling-tube, and other pairs of contacting rollers arranged with their lines of contact in a plane tangent to the lower surface of the first-mentioned pair of rollers.

5. In a machine of the class described, the combination with means for filling the tubular casing, of rollers for rolling said filled casing, and means for cleaning said rollers, said means adapted to precipitate the adhering material in the path of movement of said filled casing.

6. In a machine of the class described, the combination with the receptacle and the filling-tube adapted to receive the tubular casing that is to be filled, of a pair of contacting rollers located below said filling-tube and adapted to compress the filled casing, and other pairs of contacting rollers arranged with their axes in parallelism to each other and to the said pair below said filling-tube.

7. In a machine of the class described, the combination with the receptacle and the filling-tube adapted to receive the tubular casing, of a pair of contacting rollers located below said filling-tube and adapted to compress the filled casing, and other pairs of contacting rollers arranged with their axes in a common plane and parallel with each other.

8. In a machine of the class described, the combination with the receptacle and the filling-tube adapted to receive the tubular casing, of a pair of contacting rollers located below said filling-tube and adapted to compress the filled casing, and other pairs of contacting rollers arranged with their lines of contact in a common plane, and guide-plates intermediate the said pairs and having their top surface lying in said plane.

In testimony whereof I affix my signature in presence of two witnesses.

CARL IMBODEN.

Witnesses:
   ED. V. WALDKIRCH,
   PAUL SCHNEIDER.